United States Patent [19]
Hopf et al.

[11] Patent Number: 5,590,000
[45] Date of Patent: Dec. 31, 1996

[54] PIVOTING DEVICE FOR A SHUTTER ARRANGED IN THE AREA OF THE INSERTION OPENING OF THE LOADING MECHANISM OF A MAGNETIC-TAPE CASSETTE APPARATUS

[75] Inventors: Christian Hopf, Hüttenberg-Rechtenbach; Hans-Georg Hermanni, Sinn-Fleisbach, both of Germany

[73] Assignee: U.S. Philips Corporation, New York, N.Y.

[21] Appl. No.: 598,417

[22] Filed: Feb. 8, 1996

Related U.S. Application Data

[63] Continuation of Ser. No. 293,984, Aug. 22, 1994, abandoned.

[30] Foreign Application Priority Data

Aug. 24, 1993 [DE] Germany .......................... 43 28 443.4

[51] Int. Cl.[6] .............................................. G11B 15/675
[52] U.S. Cl. .......................................................... 360/96.5
[58] Field of Search ................................ 360/93, 95, 96.5

[56] References Cited

U.S. PATENT DOCUMENTS

| | | | |
|---|---|---|---|
| 3,800,328 | 3/1974 | Harian et al. | 360/137 |
| 4,866,552 | 9/1989 | Nagase | 360/96.5 |
| 4,933,790 | 6/1990 | Mitumaru | 360/96.5 |
| 4,953,045 | 8/1990 | Toga | 360/96.5 |
| 5,038,238 | 8/1991 | Kim | 360/96.5 |
| 5,050,022 | 9/1991 | Aizawa | 360/96.5 |
| 5,189,573 | 2/1993 | Klös-Hein et al. | 360/85 |
| 5,345,351 | 4/1994 | Krohn | 360/96.5 |
| 5,371,642 | 12/1994 | Bryer | 360/96.5 |

FOREIGN PATENT DOCUMENTS

| | | |
|---|---|---|
| 0156443 | 10/1985 | European Pat. Off. . |
| 0374899 | 6/1990 | European Pat. Off. . |
| 4009623 | 10/1991 | Germany . |

Primary Examiner—Stuart S. Levy
Assistant Examiner—William J. Klimowicz
Attorney, Agent, or Firm—Brian J. Wieghaus

[57] ABSTRACT

A pivoting device for a shutter (51) is arranged in the area of the insertion opening of the loading mechanism of a magnetic-tape-cassette apparatus, which shutter is pivotable into an open position during the loading and unloading process of a magnetic-tape cassette (66), after which it resumes its closed position. The magnetic-tape cassette (66) is mechanically drawn inwards from a take-over position (E) and subsequently lowered into a play position (68) by a slide (9) with the aid of a motor drive, from which play position it is lifted and is moved to the take-over position (E) by the slide (9) during unloading. A lever arrangement (52) for the actuation of the shutter (51) is constructed in such a manner that during mechanically produced cassette movements, during which the mechanical drive is loaded to an increased extent, the lever arrangement is disengaged from the mechanical drive by an actuating rod (57). The actuating rod is actuated by the slide (9) and is movable in the insertion and the eject direction by the slide (9), and moves in the eject direction (70) during unloading and during this movement opens the shutter via a two-arm coupling lever (54). The shutter (51) is disengaged from the slide (9) during the loading process.

14 Claims, 3 Drawing Sheets

5,590,000

PIVOTING DEVICE FOR A SHUTTER ARRANGED IN THE AREA OF THE INSERTION OPENING OF THE LOADING MECHANISM OF A MAGNETIC-TAPE CASSETTE APPARATUS

BACKGROUND OF THE INVENTION

This is a continuation of application Ser. No. 08/293,984, filed on Aug. 22, 1994, now abandoned.

The invention relates to a pivoting device for a shutter arranged in the area of the insertion opening of the loading mechanism of a magnetic-tape-cassette apparatus, which shutter is pivotable into an open position during the loading and unloading process, after which it resumes its closed position, the magnetic-tape cassette being mechanically drawn inwards from a take-over position and subsequently lowered into a play position by a slide with the aid of a motor drive, from which play position it is lifted and is moved to the take-over position by the slide during unloading.

Such a pivoting device for a shutter is known from EP 156 443 B1. The shutter has approximately the same dimensions as the insertion opening of the cassette holder of a deck for magnetic tape cassettes and serves to close the insertion opening in order to avoid the optically undesirable impression of an open hole and preclude undesired access. Moreover, such a shutter protects the interior of the deck against dust and other contaminants. The shutter is mounted on mounting arms which project substantially perpendicularly from the shutter into the apparatus. The free ends of the mounting arms have lugs which engage with pins of the deck frame. The pivotal axis thus defined extends parallel to the upper edge of the shutter. The mounting arms and the pivots form a pivoting device which is actuated by guide pins of the cassette holder. The shutter is opened to insert a cassette. At the end of the path of manual insertion, from a take-over point, a motor drive takes over further insertion. The guide pins, which act upon elastic tongues, then pull the shutter into a closed position as the cassette holder is lowered. When the magnetic-rope cassette is subsequently ejected the guide pins lift and pivot the shutter back into the open position.

U.S. Pat. No. 3,800,328 discloses a pivoting device for a shutter for the insertion opening of the cassette holder of a magnetic-rope-cassette apparatus in which the shutter is connected to a pivotal spindle by one of its long edges. This spindle comprises two parts and the two interlocking spindle parts are each spring-loaded to pivot the shutter before the insertion opening alternately from one side and from the other side. When a cassette is inserted the front wall of the cassette pushes the shutter aside, causing one of the springs to be tensioned so as to allow the shutter to spring back into the initial position. Upon complete insertion of the cassette, the cassette will be clear of the shutter and the spring pivots the shutter back into the initial position. If the cassette is ejected from the apparatus it also pivots the shutter aside, but now in the opposite direction, and the second spring is tensioned to ensure that after removal of the cassette the shutter is returned into the initial position, in which it closes the insertion opening.

With the known motor-driven loading mechanisms the motor load is not steady. There are operating ranges in which a comparatively high and a comparatively low motor load occurs. A higher driving power is required particularly during lifting of the cassette.

From EP 374,899 A2 it is known not to activate the drive of a shutter until the magnetic-tape cassette has already been lifted in order to be ejected. Such a mechanism will fail in the case of short actuation paths.

SUMMARY OF THE INVENTION

It is an object of the invention to provide a pivoting device of the type defined in the opening paragraph, whose spare driving power is situated in that operating cycle of the loading/unloading process in which the power necessary for handling the cassette is low.

According to the invention this object is achieved by a lever arrangement for the actuation of the shutter, which arrangement is constructed in such a manner that at least during mechanically produced cassette movements, during which the mechanical drive is loaded to an increased extent while the magnetic-tape cassette is lifted out of the play position, an actuating rod, which is movable in the insertion and the eject direction by the slide, is disengaged from a coupling lever of the lever arrangement, which coupling lever is coupled to the shutter and enables the actuation path of the shutter to be extended, the shutter being disengaged from the actuating rod during the loading process.

The opening movement of the shutter during unloading is thus transferred to the movement period in which the cassette has already been lifted. During this lifting, the motor drive is loaded to a stronger extent than during the subsequent ejection cycle. The shutter movement is thus transferred to the movement cycle in which the load of the drive is smaller.

When the cassette is lifted from the playing level to the loading level, the actuating mechanism for the shutter is not loaded and the slide is coupled to the coupling lever only when the slide already ejects the cassette. In this operating cycle, the motor load of the motor-driven loading mechanism is substantially smaller than during lifting of the magnetic-tape cassette.

In a further embodiment of the invention, the two-arm coupling lever is pivotable so as to actuate an opening rod which is connected to the shutter via a guide surface and which moves the shutter into the open position.

In still a further embodiment of the invention the actuating rod is provided with a coupling pin which enables the actuating rod to be coupled to the coupling lever.

In yet another embodiment of the invention, the two-arm coupling lever has an actuating lever arm, on which the actuating rod acts, and an opening lever arm, which cooperates with the opening rod, the actuating lever arm being shorter than the opening lever arm. This makes the path along which the shutter is moved substantially shorter. A suitable ratio between the travel of the actuating rod and the travel of the opening rod, which is adjustable by means of the coupling lever, enables the shutter to be opened completely during the very short travel of the coupling lever.

BRIEF DESCRIPTION OF THE DRAWINGS

The invention will now be described in greater detail with reference to the drawings. In the drawings.

DETAILED DESCRIPTION OF THE PREFERRED EMBODIMENTS

Every magnetic tape apparatus has a loading mechanism which enables a magnetic tape cassette to be introduced into the apparatus and subsequently enables the cassette to be transferred to a play position inside the apparatus, in which position winding spindles (not shown) engage the reels of the magnetic tape cassette.

Figure 1:
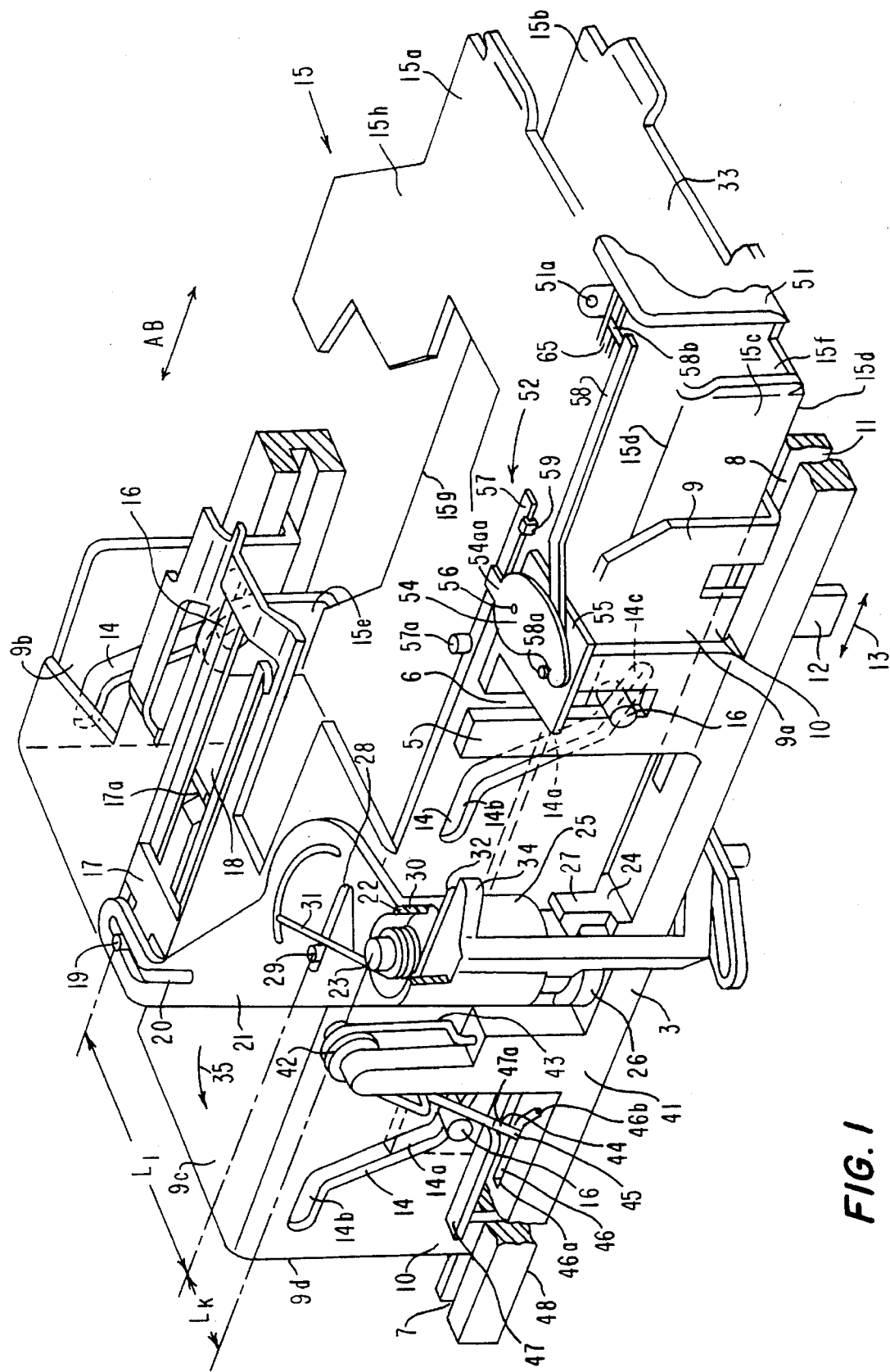
FIG. 1 shows diagrammatically a loading mechanism for a magnetic-tape-cassette apparatus with a pivoting device for a shutter.

Such a loading mechanism is shown diagrammatically in FIG. 1 and is accommodated on a separate chassis plate 3. The chassis plate 3 carries at least one vertical supporting plate 5 having a vertical guideway 6. The chassis plate 3 has guideways 7 and 8, which guide a slide 9 in the draw-in and eject directions along the vertical supporting plate 5. The guideways 7 consists of grooves, in which webs 10 of the slide 9 are movable in the directions AB. A coupling limb 12 adjoins the web 10 of the guideway 8 and extends through an opening 11 in the chassis plate 3. The coupling web 12 can be moved back and forth in a manner not shown in the direction indicated by a double arrow 13 by means of a draw-in mechanism (not shown) of the magnetic tape apparatus. The direction of movement corresponds to the draw-in and eject direction AB.

The slide 9 comprises a front slide section 9a and a rear slide section 9b, which are connected by a horizontal slide connecting plate 9c. Moreover, a backplate connecting the rear edges 9d may be provided at the rear edges. Lift slots 14 have been provided in slide sections 9a, 9b.

Each lift slot 14 has a central portion 14a which is inclined relative to the vertical supporting-plate slot 6 at a given angle of, for example, approximately 8°. All central portions 14a of the slots 14 are inclined at the same angle relative to the vertical. The inclined upper ends of the central portions 14a of the lift slots 14 are adjoined by substantially horizontal rearward end portions 14b, which extend toward the rear of the mechanism and which allow an overtravel for the ejection movement of the slide. The lower ends of the central portions 14a are adjoined by forward end portions 14c which extend in the forward direction and which are inclined in the lowering direction, to allow an overtravel at the end of the draw-in movement.

A cassette holder 15 is situated between the slide plate portions 9a and 9b. This cassette holder 15 essentially comprises two guide plates 15a, 15b which are spaced apart one above the other in horizontal planes and are connected at longitudinal edges 15d by a guide plate 15c. Thus, the cassette holder 15 is U-shaped with a base formed by the guide plate 15c and two limbs formed by the guide plates 15a, 15b. An inserted magnetic-tape cassette, not shown, can be guided between the guide plates 15a, 15b. The guide plate 15c has two pins 16 which project laterally from it and engage the lift slots 14 in the slide. A lug 15e on the part of the cassette holder 15 shown at the rear in FIG. 1 has been provided with a pin 16, which engages in the lift slot 14 of the slide section 9b shown at the rear. In the forward part of the loading mechanism at least one of the pins 16 extends through the lift slot 14 and the supporting-plate slot 6. The cassette holder 15 is moved up and down by sliding the slide 9 back and forth by means of the coupling member 12.

A cassette driver 17, which is guided in a guide slot 18 in the slide connecting plate 9c, serves for drawing in and ejecting a cassette. The guide slot 18 extends in the directions indicated by the double arrows 13 and AB.

The cassette driver 17 has a coupling pin 19 which extends through a slot 20 in an actuating lever 21. This actuating lever 21 has a bearing 22. This bearing 22 comprises an upright journal 23 provided on a support 24 connected to the chassis plate 3. Preferably, it is an injection-moulded part which is integral with the chassis plate 3. The journal 23 is surrounded by a bearing sleeve 25 which forms part of the actuating lever 21. At its lower end the bearing sleeve 25 has a collar 26, over which a hook 27 of the support engages.

The actuating lever 21 has a guide slot 28 through which a coupling pin 29 arranged on the slide connecting plate 9c extends.

The journal 23 is situated adjacent the slide 9 outside this slide. By coupling the slide 9 to the actuating lever 21 via the coupling pin 29, two lever arms $L_k$ and $L_1$ of different lengths are obtained, which are of significance for the path of movement of the cassette driver 17. Even short slide movements result in long paths of movement of the cassette driver 17.

A return spring 30 is fitted on the journal 23 in the upper part of the bearing 22. The sleeve 25 of the actuating lever 21 extends beyond this return spring 30, which takes the form of a helical spring. The helical spring has an end arm 31 and 32 at each of its ends. As seen from the insertion side 33 of the cassette holder 15, the end arm 31 lies against the coupling pin 29. The other end arm 32 is supported on a projection 34 of the bearing sleeve 25. The device serves to return the cassette if the draw-in mechanism of the magnetic tape apparatus does not respond.

At the location of the bearing 22, a loading spring 42 is arranged on a part 41 belonging to the chassis plate 3, which spring, in the same way as a hairpin spring, has two diverging spring arms, a forward spring arm 43 and a rearward spring arm 44. The forward spring arm 43 is supported on the chassis plate 3 so as exert pressure in the eject direction. The free end 45 of the rearward spring arm 44 engages a guide slot 46 in the chassis plate 3. The rearward spring arm 44 exerts pressure on a surface 47a of a projection 47 of the slide 9, which pressure is directed towards the rear 9d of the loading mechanism. This projection 47 can move beyond the rear portion 46a of the guide slot 46, which portion extends in the eject direction.

The guide slot 46 bends forward and towards the outer side 48 of the loading mechanism, forming a portion 46b which enables the rearward spring arm 44 to be pushed aside off the projection 47 as it is moving forward. After this pushing aside, the projection 47 of the slide 9 moves past the free end 45 of the spring arm 44, which end has been pushed outwards. Subsequently, the spring 42 no longer loads the motor drive, so that this drive now has a power reserve. For further details on this loading mechanism reference is made to U.S. Pat. No. 5,189,573.

Figure 2:
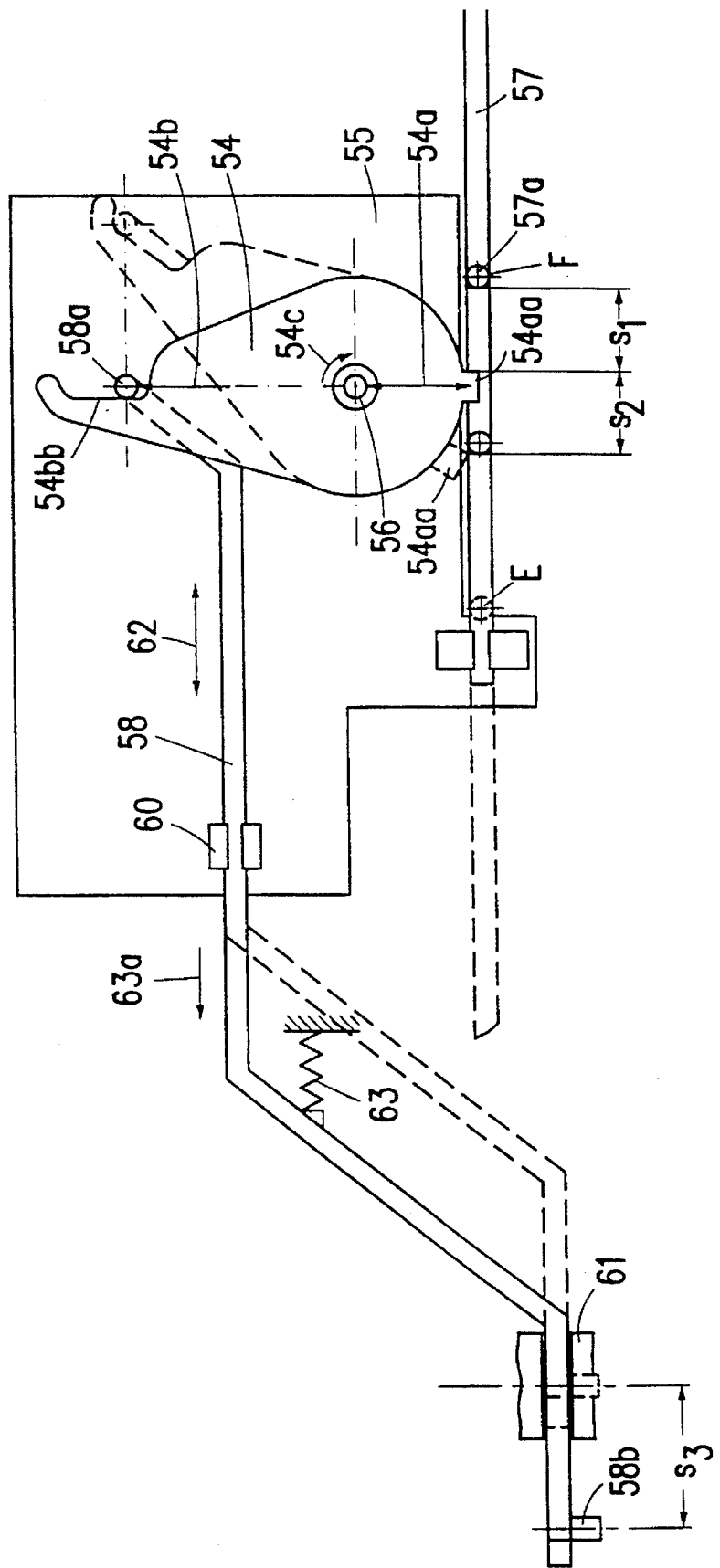
FIG. 2 is a plan view of the pivoting device of the loading mechanism shown in FIG. 1.
Figure 3:
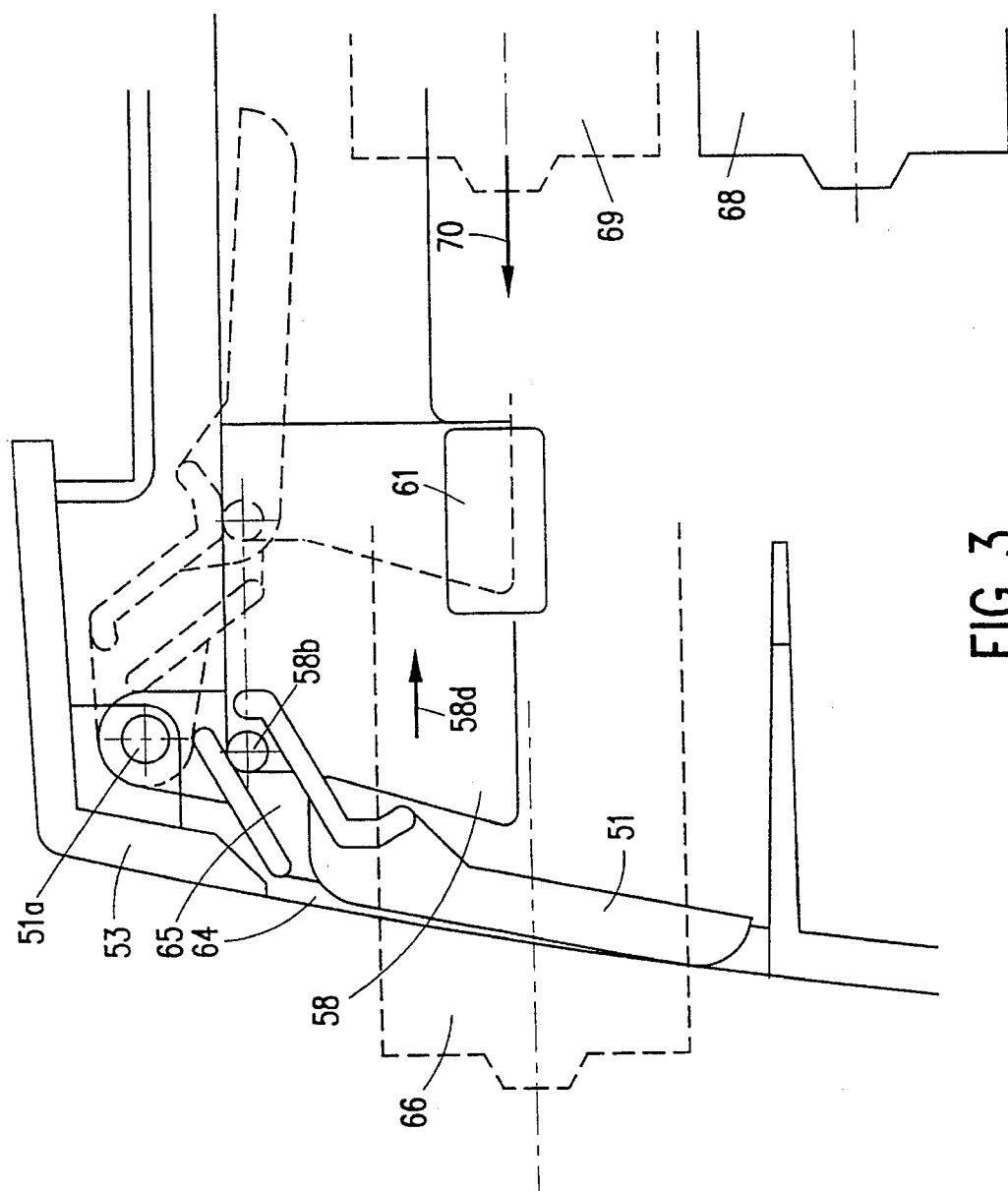
FIG. 3 is a side view of the shutter and its actuating elements.

If the loading mechanism shown in FIG. 1 is mounted in a magnetic-tape-cassette apparatus, for example a car radio, the insertion side 33 of the cassette holder 15 will be closed by means of a shutter 51. The shutter 51 is in this closed position if the cassette holder 15 with an inserted cassette, not shown, has been lowered to the playing level into its play position. A lever arrangement 52 serves to actuate the shutter 51. The lever arrangement is shown comparatively diagrammatically in perspective view in FIG. 1 and in plan view in FIG. 2. FIG. 3 shows the shutter 51 in the front 53 of the apparatus while it cooperates with the lever arrangement 52 shown in FIGS. 1 and 2.

The pivoting device of the lever arrangement 52 comprises a coupling lever 54, which is pivotable about a pivot 56 on a plate 55 fixed to the chassis. The coupling lever 54 has an actuating lever arm 54a and an opening lever arm 54b. The actuating lever arm has a control nose 54aa at its free end and the opening lever arm has a sliding recess 54bb at its free end. The control nose 54aa cooperates with a pin 57a of an actuating rod 57. The sliding recess 54bb is engaged by a pin 58a of an opening rod 58. The actuating rod 57 has a sliding member 59 in its front area. The opening rod 58 is guided in the plate 55 by a guide 60. A further guide 61 for the opening rod 58 ensures a tilt-free movement in the direction of movement 62 of this rod. A spring 63 urges the opening rod 58 in the direction indicated by an arrow 63a. At the end of the opening rod 58 nearest insertion side 33 of the apparatus, a coupling pin 58b engages a guide groove 65 in the shutter 51. The coupling lever 54 is spring-loaded in a direction indicated by an arrow 54c by means of a wire spring, not shown.

The cassette loading mechanism, the lever arrangement 52 and the shutter 51 operate as follows. A magnetic-tape cassette referenced 66 in FIG. 3 is inserted into the insertion side 33 of the cassette holder 15. The cassette holder 15 is then in an upper lifted position. The pins 16 of the cassette holder 15 engage in the rearward end portions 14b of the lift slots 14. The inserted cassette 66 pivots the shutter 51 counterclockwise about the shutter pivot 51a into the broken-line position in FIG. 3 and moves the opening rod 58 in the direction indicated by an arrow 58d via a guide surface 65. The pin 58a of the opening rod 58 then travels to the right in FIGS. 2 and 3 into the further broken-line position, the coupling lever 54 being pivoted clockwise and following the pin 58a. The control nose 54aa then assumes the broken-line position in FIG. 2. The pin 57a of the actuating rod 57 is then in position E. This is the end position of the mechanical movement, i.e. the take-over position.

Actuated by hand, the magnetic-tape cassette 66 now moves the cassette holder 15 into the slide 9, said slide being moved in the insertion direction and the pins 16 being lowered in the lift slots 14 in the slide 9 towards the slot ends 14c. The reel-hub opening situated at the front of the inserted cassette, viewed in the insertion direction, moves underneath a coupling hook 17a of the cassette driver 17 until it engages the reel-hub opening of the cassette. As insertion proceeds, the cassette driver 17 will move the actuating lever 21 in the anti-clockwise direction indicated by an arrow 35. At this instant, provision is made for the motor-driven loading mechanism of the magnetic tape apparatus to be switched on and for the coupling member 12 to be moved mechanically in the draw-in direction. When the loading mechanism is put into operation and the slide 9 travel toward the rear, the coupling pin 29 also travels toward the rear. Likewise, the pin 57a moves toward the rear. The shutter 51 is kept in its tilted position by the magnetic-tape cassette 66, thus allowing the pin 57a to move freely from position E on the control nose 54aa into position F. As the mechanical loading movement proceeds the magnetic-tape cassette 66 clears the shutter 51. The spring 63 then draws the opening rod 58 again to the left in the direction indicated by the arrow 63a, as a result of which the coupling pin 58b again pivots the shutter 51 clockwise into the closed position guided by the guide surface 65. The coupling lever 54 follows this movement and the control nose 54aa thus enters the path of movement of the pin 57a.

The slide thus travels as far as its rearward end position, the cassette holder 15 being lowered into the play position in the guide slots 6 via the pins 16 and the lift slots 14.

If the magnetic-tape cassette is to be ejected, an electrical command actuates the loading mechanism, not shown, in a reverse sequence, the magnetic-tape cassette 66 being lifted from the play position 68 shown in FIG. 3 into the loading position 69. As unloading proceeds the magnetic-tape cassette is moved out in the direction indicated by an arrow 70. During the lifting process from the play position 68 into the loading position 69, the cassette holder 15 is lifted and the slide 9 moves forward. The first part of this path is referenced $S_1$ in FIG. 2. This is the movement which requires much motor power to lift the magnetic-tape cassette 66 into the loading position or to the loading level. Moreover, the loading spring 42, which acts in the insertion direction, is still active. The actuating rod 57, which is already moving, then also moves the pin 57a over the path $S_1$. During this movement the pin 57a is not yet in contact with the control nose. The lever arrangement 52 thus remains deactivated and does not load the motor drive of the loading mechanism. The power reserve of the drive increases as soon as the magnetic-tape cassette 66 has been lifted to the loading level. This is the instant at which the pin 57a contacts the control nose 54aa at the end of the path $S_1$. The pin 57a now drives the control nose 54aa and pivots the coupling lever 54 clockwise into the broken-line position in FIG. 2. The coupling lever 54 thus actuates the opening rod 58 and pivots the shutter 51 into the broken-line shutter position in FIG. 3 via the guide surface 65. At the end of the path $S_2$ the shutter 51 is open, the magnetic-tape cassette has reached the opened shutter and now keeps it in the open position. The pin 57a can now move into position E past the control nose 54aa, which has been pivoted away.

The magnetic-tape cassette is now withdrawn by hand and the shutter 51 falls back into the closed position.

The length ratio between the actuating lever arm 54a and the opening lever arm 54b is dimensioned in such a manner that the short path $S_2$ of the actuating rod 57 is converted into a long path $S_3$ of the opening rod 58. The drive has a large power reserve along the path $S_3$.

We claim:

1. A pivoting device for a shutter pivotally arranged at a cassette insertion opening of a magnetic tape cassette apparatus, which cassette apparatus includes (i) a loading mechanism comprising a slide, translatable in an insertion and an ejection direction, between a slide takeover position and a slide play position, which loading mechanism (a) moves a tape cassette into and out of the apparatus through the cassette insertion opening and (b) moves the tape cassette between a takeover position and a play position corresponding to the takeover and play positions of the slide, respectively, and (ii) an electromotive drive for moving said slide, said drive being loaded to its greatest load while the loading mechanism moves the tape cassette from the play to the takeover position, wherein said pivoting device comprises:

a coupling lever;

shutter coupling means for disengagingly coupling said coupling lever to the shutter, said coupling lever being pivotable to move the shutter between an open and a closed position;

an actuating rod engageable with said coupling lever, said slide being coupled to the actuating rod for moving the actuating rod in the insertion and ejection direction during respective movement of said slide in each of said insertion and ejection directions, said actuating rod being arranged relative to said coupling lever such that said actuating rod (i) is not coupled to said coupling lever during movement of said slide in the ejection direction from said slide play position to said slide takeover position by said electromotive drive, during which said electromotive drive is loaded to its greatest extent, and (ii) is coupled to said coupling lever when said slide is moved in the ejection direction from the slide takeover position.

2. A pivoting device according to claim 1, further comprising an opening rod for disengagingly coupling the shutter to said coupling lever, said opening rod being decoupled from said coupling lever during movement of a cassette through said insertion opening to said cassette play position during movement of said slide from the slide takeover position to the slide play position.

3. A pivoting device according to claim 1, further comprising an opening rod for connection to the shutter and actuatable by said coupling lever to open the shutter.

4. A pivoting device as claimed in claim 3, characterized in that the actuating rod includes a coupling pin for coupling the actuating rod to the coupling lever.

5. A pivoting device as claimed claim 4, characterized in that the coupling lever has an actuating lever arm, on which the actuating rod acts, and an opening lever arm, which cooperates with the opening rod, the actuating lever arm being shorter than the opening lever arm.

6. A pivoting device as claimed in claim 3, characterized in that the coupling lever has an actuating lever arm, on which the actuating rod acts, and an opening lever arm, which cooperates with the opening rod, the actuating lever arm being shorter than the opening lever arm.

7. A pivoting device as claimed in claim 1, characterized in that the coupling lever has an actuating lever arm, on which the actuating rod acts, and an opening lever arm, which cooperates with said shutter coupling means, the actuating lever arm being shorter than the opening lever arm.

8. A magnetic tape cassette apparatus, comprising:

an insertion opening for receiving a tape cassette;

a pivotable shutter pivotable between an open and a closed position;

a loading mechanism for moving the tape cassette between a cassette takeover position and a cassette play position, said loading mechanism including a slide for transporting the tape cassette between the cassette takeover position and the cassette play position, said slide being translatable in an insertion and an opposite, ejection direction between a slide takeover position and a slide play position corresponding, respectively, to the cassette takeover and cassette play positions;

an electromotive drive for moving said slide, said drive being subject to its greatest load while said loading mechanism moves said slide from the slide play position to the slide takeover position;

a coupling lever;

shutter coupling means for disengagingly coupling said coupling lever to said shutter, said coupling lever being pivotable to move said shutter between the open and the closed positions;

an actuating rod engageable with said coupling lever, said slide being coupled to said actuating rod for moving said actuating rod in the insertion direction and the ejection direction during respective movement of said slide in each of said insertion and ejection directions, said actuating rod being arranged relative to said coupling lever such that said actuating rod (i) is not coupled to said coupling lever during movement of said slide in the ejection direction from said slide play position to said slide takeover position by said electromotive drive, during which said electromotive drive is loaded to its greatest extent, and (ii) is coupled to said coupling lever when said slide is moved in the ejection direction from the slide takeover position.

9. A magnetic tape cassette apparatus according to claim 8, further comprising an opening rod disengagingly coupling said shutter to said coupling lever, said opening rod being decoupled from said coupling lever during movement of a cassette through said insertion opening to said cassette play position during movement of said slide from the slide takeover position to the slide play position.

10. A magnetic tape cassette apparatus according to claim 8, wherein said shutter coupling means includes an opening rod connected to said shutter and actuatable by said coupling lever to open said shutter.

11. A magnetic tape cassette apparatus as claimed in claim 10, characterized in that said actuating rod includes a coupling pin for coupling said actuating rod to said coupling lever.

12. A magnetic tape cassette apparatus claimed in claim 11, characterized in that said coupling lever has an actuating lever arm, on which said actuating rod acts, and an opening lever arm, which cooperates with said opening rod, said actuating lever arm being shorter than said opening lever arm.

13. A magnetic tape cassette apparatus claimed in claim 10, characterized in that said coupling lever has an actuating lever arm, on which said actuating rod acts, and an opening lever arm, which cooperates with said opening rod, said actuating lever arm being shorter than said opening lever arm.

14. A magnetic tape cassette apparatus claimed in claim 8, characterized in that said coupling lever has an actuating lever arm, on which said actuating rod acts, and an opening lever arm, which cooperates with said shutter coupling means, said actuating lever arm being shorter than said opening lever arm.

* * * * *